(12) United States Patent
Naito et al.

(10) Patent No.: US 6,670,564 B2
(45) Date of Patent: Dec. 30, 2003

(54) LEVER APPARATUS FOR VEHICLE

(75) Inventors: Hiroyuki Naito, Aichi (JP); Takehiko Furuta, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/281,946

(22) Filed: Oct. 29, 2002

(65) Prior Publication Data

US 2003/0102202 A1 Jun. 5, 2003

(51) Int. Cl.$^7$ .................................................. H01H 9/00
(52) U.S. Cl. ................ 200/61.54; 200/61.27; 200/61.28
(58) Field of Search ............... 200/61.54, 61.27, 200/61.28, 4, 17 R, 43.16, 61.3, 61.38

(56) References Cited

U.S. PATENT DOCUMENTS

| | | | | |
|---|---|---|---|---|
| 4,132,129 A | * | 1/1979 | Pratt | 74/553 |
| 4,400,598 A | * | 8/1983 | Jandl et al. | 200/16 D |
| 4,849,585 A | * | 7/1989 | Vidican et al. | 200/61.54 |
| 5,294,759 A | * | 3/1994 | Krehnovi | 200/61.27 |
| 5,724,719 A | * | 3/1998 | DuRocher et al. | 29/622 |
| 5,852,867 A | * | 12/1998 | Durocher | 29/622 |
| 6,025,565 A | * | 2/2000 | Miyase et al. | 200/61.28 |
| 6,114,640 A | * | 9/2000 | Oddo et al. | 200/61.27 |
| 6,534,733 B2 | * | 3/2003 | Schwartz et al. | 200/61.54 |

* cited by examiner

Primary Examiner—Lincoln Donovan
Assistant Examiner—K. Lee
(74) Attorney, Agent, or Firm—Morgan, Lewis & Bockius LLP

(57) ABSTRACT

A lead wire (18) is connected to a terminal (17) of a substrate (14) of an electrical component. Subsequently, the substrate is attached to a substrate attaching portion (5) of a lever base (1). Moreover, a midway portion of the lead wire is inserted into and placed in a lead wire guide portion (6) of a large-diameter portion (2). Thereafter, a cylindrical cover member (20) is attached to the outside of the lever base in such a manner as to cover the whole of the large-diameter portion and the substrate. There is no necessity for performing an operation of inserting the lead wire into a fine lead wire insertion hole. Moreover, the large-diameter portion, the substrate, the substrate, and the lead wire are covered by the cover member. Thus, there is no need for forming a cutout in the cover member.

3 Claims, 5 Drawing Sheets

LEVER APPARATUS FOR VEHICLE

BACKGROUND OF THE INVENTION

This invention relates to a lever apparatus for a vehicle, which includes an electrical component provided in a lever.

For example, in a certain conventional lever switch apparatus for operating a headlight of an automobile, a lever is provided in such a way as to project from a switch base that is provided in a vehicle steering column. An operating knob for operating the headlight is turnably provided at an end portion of the lever. Moreover, an intermediate knob for operating a fog lamp is turnably provided in a midway portion in an axial direction of the lever.

In this lever switch apparatus, a light switch to be operated by the operating knob is provided at a switch-base-side portion. A shaft is inserted through the inside of the lever. The operating knob is attached to an end portion of this shaft in such a way as to turn integrally with the shaft. The shaft is turned by performing an operation of turning the operating knob. A headlight switch is switched by a switch operating portion provided on a base-side portion of the shaft.

A fog lamp switch to be operated by the intermediate knob is provided in the inside of the lever. This fog lamp includes a stationary contact provided on a substrate, and a moving contact adapted to move integrally with the intermediate knob. A plurality of connecting terminals connected to the stationary contact are provided on the substrate of the electrical component. An end portion of each of lead wires is soldered to a corresponding one of the connecting terminals. The other end portion of each of the lead wires is passed through a corresponding one of relatively fine lead-wire insertion holes formed in a lower knob on the base-portion side of the lever, and led to the base-portion side (that is, vehicle-side) of the lever.

Incidentally, when lead wires are connected to the connecting terminals formed on the substrate of the fog lamp switch, which is an electrical component provided in the lever, in the apparatus of the aforementioned configuration, first, a plurality of lead wires are inserted into the lead-wire insertion holes formed in the lower knob in such a way as to pass therethrough. Subsequently, an end portion of each of the lead wires is soldered to a corresponding one of the connecting terminals of the substrate at the leading end portion of the lower knob. The substrate is attached to the lower knob while each of the lead wires is drawn back to the base-portion side of the lower knob. However, in the case of the aforementioned conventional apparatus, it is necessary to insert the lead wires of the fog lamp switch into the relatively fine lead-wire insertion holes formed in the lower knob. Such an inserting operation is troublesome. Assembly workability thereof is poor.

Further, another certain conventional apparatus reduces the length of the lead-wire insertion holes (that is, the length by which the lead wire is inserted therethrough) by providing a cutout in a part of the lower knob and leading the lead wires from the cutout. However, this conventional apparatus has drawbacks in that it is necessary to perform an operation of passing lead wires through the relatively fine lead-wire insertion holes, and that the cutout provided in the lower knob having a design face impairs the appearance thereof.

SUMMARY OF THE INVENTION

The invention is accomplished in view of the aforementioned circumstances. Accordingly, an object of the invention is to provide a lever apparatus for a vehicle, which has an electrical component provided in a lever and which is enabled to enhance assembly workability thereof without impairing the appearance thereof.

In order to solve the aforesaid object, the invention is characterized by having the following arrangement.

(1) A lever apparatus for a vehicle comprising:
 a lever base including a large-diameter portion provided at an intermediate portion in a axial direction thereof, an electrical component attaching portion provided at a part thereof, which is closer to an end portion thereof than the large-diameter portion, and a base-portion attached to the vehicle;
 a lead wire guide portion provided in the large-diameter portion and opened in a radial direction of the lever base and at axial end parts thereof;
 an electrical component including a connecting terminal, which is attached to the electrical component attaching portion;
 a lead wire including an end part thereof connected to the connecting terminal, a midway portion disposed in the lead wire guide portion, and the other end part to be led to the vehicle; and
 a cylindrical cover member for covering the whole of the large-diameter portion and the electrical component.

(2) The lever apparatus according to (1) further comprising:
 a shaft portion, provided in a central portion of the lever base so as to pass therethrough in the axial direction, and including an engaging portion provided at an end-portion-side part thereof and a switch operating portion provided at a base-portion-side part thereof; and
 an operating knob including a engaged portion, which is attached to an end part of the shaft portion by engaging the engaging portion with the engaging portion, and adapted to operate the switch operating portion through the shaft portion by a turning operation.

(3) The lever apparatus according to (2), wherein
 the shaft portion is divided in an axial direction into a first shaft part, provided at the end-portion-side part to which the operating knob is attached, and a second shaft part, provided at the base-portion-side part including the switch operating portion,
 a pair of engaging claws is provided in the first shaft part so as to be inserted through an engaging hole provided in the lever base and as to be engaged therein in a slip-off preventing state, and
 an inserting piece portion to be inserted like a wedge between the pair of engaging claws, and a fitting portion to be fitted onto the pair of engaging claws from outside are provided at an end portion of the second shaft part.

When this lever apparatus is assembled, first, the lead wire is connected to the connecting terminal of the electrical component. Thereafter, when the electric component is attached to the electric component attaching portion of the lever base, the midway portion of the lead wire can be inserted through and disposed in the lead wire guide portion of the large-diameter portion. Subsequently, the cover member is attached to the exterior of the lever base in such a way as to cover the whole of the large-diameter portion and the electrical part. At that time, each of the lead wires connected to the connecting terminal is covered by the cover member.

According to the aforementioned lever apparatus of the invention, it is unnecessary to perform an operation of inserting lead wires through lead wire insertion holes. Thus, assembly workability can be enhanced. Further, because the large-diameter portion, the electric component, and the lead wires are covered by the cover member, it is unnecessary to form a cutout in the cover member. Consequently, the appearance of the apparatus is not impaired.

According to the aforementioned lever apparatus of the invention, the operating knob disposed at an end portion of the lever is attached to the shaft portion by engaging the engaged portion with the engaging portion. Thus, no additional member, such as a pin, is necessary for attaching the operating knob to the apparatus. Therefore, no additional member appears on the design face (that is, an exterior surface) of the apparatus. Consequently, the appearance thereof can be improved. Moreover, this can improve the user's feeling obtained when the user's finger abuts against the design face.

In the case of the lever apparatus of the aforementioned configuration, the operating knob is attached to an end part of the shaft portion, while the switch operating portion is provided at the base portion thereof. Therefore, when the apparatus has only one shaft, the shaft cannot be attached to the lever base. Thus, the shaft portion is divided in an axial direction into the first shaft part, which is provided at the end-portion-side part to which the operating knob is attached, and the second shaft part, which is provided at the base-portion-side part having the switch operating portion. Further, the pair of engaging claws is provided in the first shaft part in such a manner as to be inserted through an engaging hole provided in the lever base and as to be engaged therein in a slip-off preventing state. On the other hand, an inserting piece portion to be inserted like a wedge between the pair of engaging claws is provided at an end portion of the second shaft part, and a fitting portion to be fitted onto the pair of engaging claws from the outside. Thus, the first shaft part and the second shaft part are connected to each other in a state, in which the first and second shaft parts rotate as one unit, by attaching the first shaft part to the lever base in such a way as to prevent the first shaft part from slipping off therefrom.

DETAILED DESCRIPTION OF PREFERRED EMBODIMENTS

FIRST EMBODIMENT

Hereinafter, a first embodiment, which is an example of the application of the invention to a lever switch apparatus for operating a light switch of an automobile, is described with reference to FIGS. 1 to 4.

Figure 1:
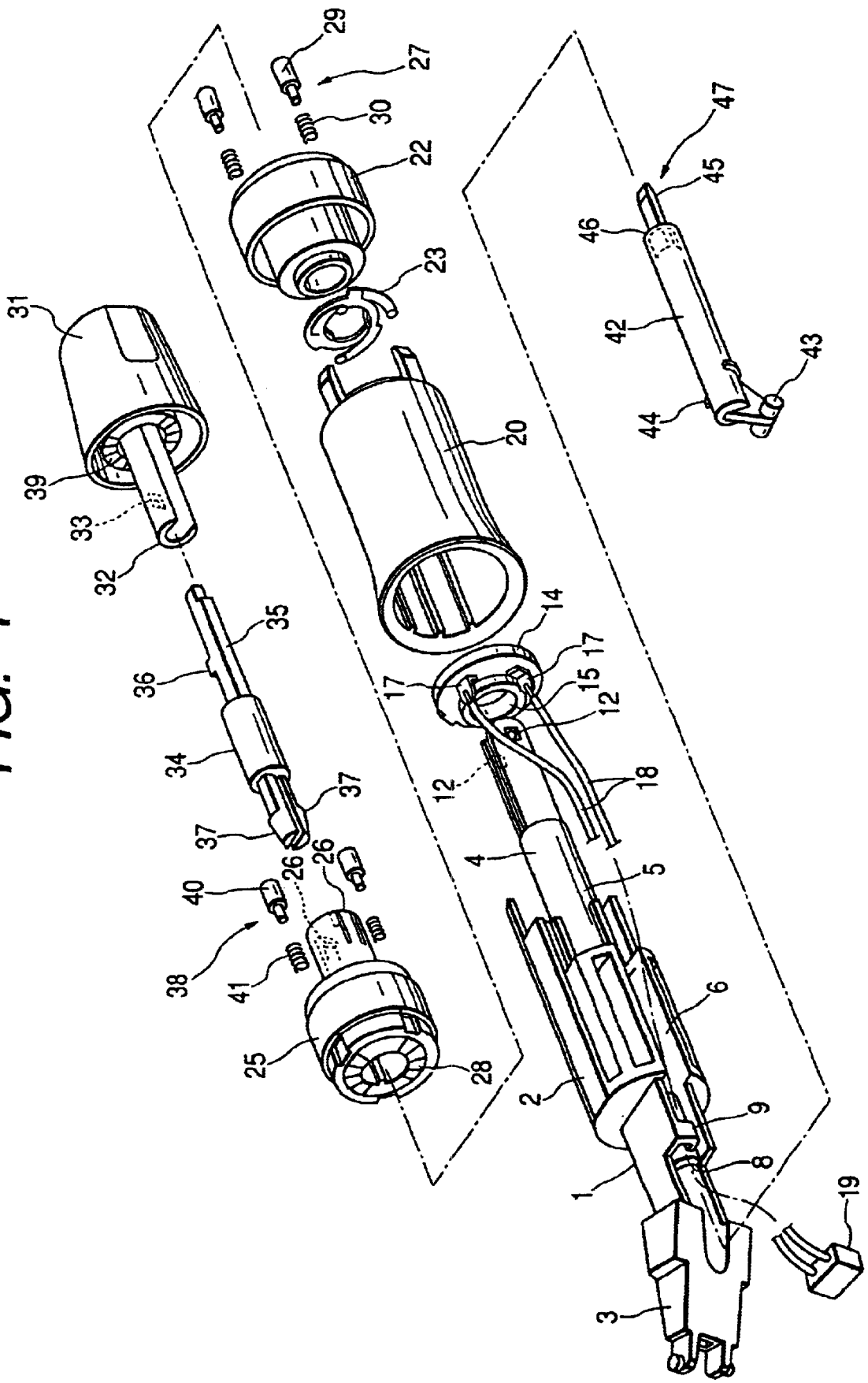
FIG. 1 is an exploded perspective view illustrating the entirety of a first embodiment of the invention.
Figure 2:
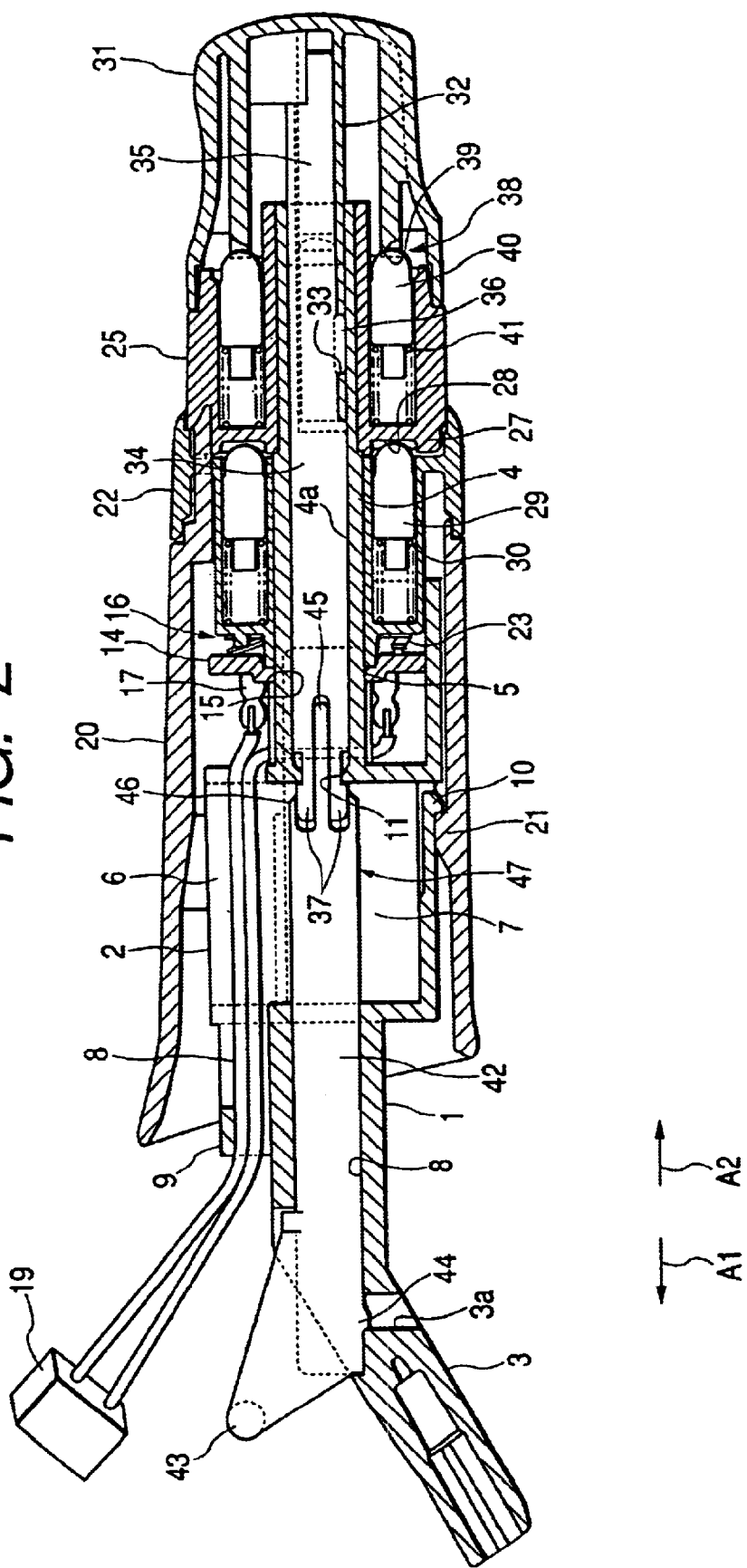
FIG. 2 is a sectional view illustrating the first embodiment that is in an assembly state.
Figure 3:
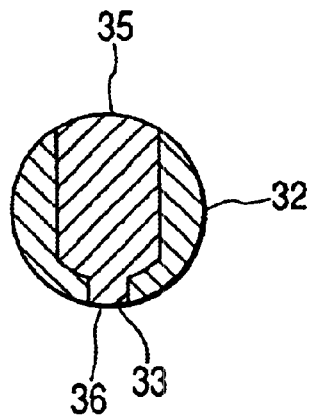
FIG. 3 is a sectional view illustrating a primary part of the first embodiment.

Referring first to FIGS. 1 and 2, there is shown a lever base 1 that extends in an axial direction, and that includes a large-diameter portion 2, whose diameter is larger than those of other parts, provided in an intermediate portion in the axial direction. An attaching portion 3 to be attached to a vehicle (not shown) is provided at a base-portion side (that is, the left side, as viewed in FIGS. 1 and 2) of this large-diameter portion 2 in such a way as to be integral therewith. A cylindrical portion 4, which is smaller in diameter than the large-diameter portion 2 and has a two-stage cylindrical shape, is provided at an end-portion side of the large-diameter portion 2 (that is, the right side, as viewed in FIGS. 1 and 2) in such a way as to be integral therewith. The inside of the cylindrical portion 4 is formed to be a shaft insertion hole 4a having a circular section. A substrate attaching portion 5 constituting an electrical component attaching portion is formed on the outer peripheral portion of the base portion of the cylindrical portion 4. A lead wire guide portion 6 is formed at a place of the large-diameter portion 2. An outer side part in the radial direction of this lead wire guide portion 6 is opened. Moreover, both end portions in the axial direction thereof are opened. The central part of the large-diameter portion 2 is formed to be a space portion 7.

A shaft insertion hole 8 having a circular section, which extends in the axial direction of the over base, is formed in the attaching portion 3. This shaft insertion hole 8 is opened at an end portion (at the side of the vehicle), and communicates with the space portion 7 of the large diameter portion 2 at the other end portion thereof (at the side of the large-diameter portion 2). A lead wire hooking portion 9 is provided at a part of the large-diameter portion 2, which is located at the side of the attaching portion 3. Elastic engaging claws 10 are provided on the outer peripheral portion of the large-diameter portion 2. An engaging hole 11, which is slightly smaller than the shaft insertion hole 4a of the cylindrical portion 4, is formed in a boundary portion between the large-diameter portion 2 and the cylindrical portion 4. This engaging hole 11 is connected to the shaft insertion hole 4a through a tapered surface. This engaging hole 11 enables the space portion 7 of the large-diameter portion 2 to communicate with the shaft insertion hole 4a. Rectangular engaging holes 12 are formed at two places opposed to each other at the side of an end part of the peripheral wall part of the cylindrical portion 4.

A substrate 14 of the electrical component is shaped like a disk having an attaching hole 15 in the central part thereof. In this case, a stationary contact (not shown) of a fog lamp switch 16 is provided on the front surface thereof (that is, a right-side surface as viewed in FIG. 2), while two connecting terminals 17 connected to the stationary contact are provided on the rear surface thereof. This substrate 14 is disposed at the substrate attaching portion 5 in a fixed condition by fitting the attaching hole 15 onto the substrate attaching portion 5. An end portion of each of the lead wires 18 is connected to a corresponding one of the connecting terminals 17 by soldering. These lead wires 18 are inserted into and disposed in the lead wire guide portion 6 of the large-diameter portion 2. The other end portion of each of the lead wires 18 is led to the attaching portion 3 of the lever base 1 during a state in which the other end portion is caught in the hooking portion 9. A connector 19 is provided at the other end portions of the lead wires 18.

A cylindrical cover member 20, whose diameter is larger than that of the large-diameter portion 2, is attached to the exterior of the lever base 1. This cover member 20 is put over the lever base 1 from an end part of the cylindrical portion 4 of the lever base 1, and attached to the lever base 1 by engaging engagement convex portions 21 provided on the inside surface thereof with the elastic engaging claws 10. This cover member 20 covers the large-diameter portion 2 and the substrate 14 from the outside.

An intermediate knob 22 for operating a fog lamp is turnably attached to the cylindrical portion 4 by being placed in such a way as to be closer to the end portion than the substrate 14. A moving contact 23 is attached to a side part of this intermediate knob 22, which part is at the side of the substrate 14, in such a way as to turn integrally with the intermediate knob 22. The fog lamp switch 16 consists of this moving contact 23 and the stationary contact provided on the substrate 14. In this case, as an operation of turning the intermediate knob 22 is performed, the moving contact 23 slides to the substrate 14 and is contacted to and separated from the stationary contact. Consequently, an operation of switching the fog lamp switch 16 is performed.

A stator 25 is attached to the cylindrical portion 4 by being positioned at a place that is closer to the end portion than the intermediate knob 22. This stator 25 is attached to the cylindrical portion 4 in a state, in which the stator 25 is prevented from being slipped off therefrom, by engaging an engaging portion 26, which is formed in the stator 25, with the engaging hole 12 of the cylindrical portion 4. Two sets of moderating mechanisms 27 for moderating an operation of turning the intermediate knob is provided between this stator 25 and the intermediate knob 22. This moderating mechanism 27 consists of a convexoconcave moderating face portion 28 at the side of the stator 25, a moderating piece 29 for moving this moderating face portion 28, and a moderating spring 30 for pushing this moderating piece 29 to the moderating face portion 28.

An operating knob 31 for operating a headlight is disposed at a place that is more closer to the end portion of the stator 25. This operating knob 31 is shaped like a cylinder, and closed at one end portion thereof. A connecting portion 32 having a U-shaped section is provided at the central portion of this operating knob 31 in such a way as to project therefrom to the stator 25. An engaging hole 33 serving as an engaged portion is formed at a portion corresponding to the bottom part of this connecting portion.

Figure 4:
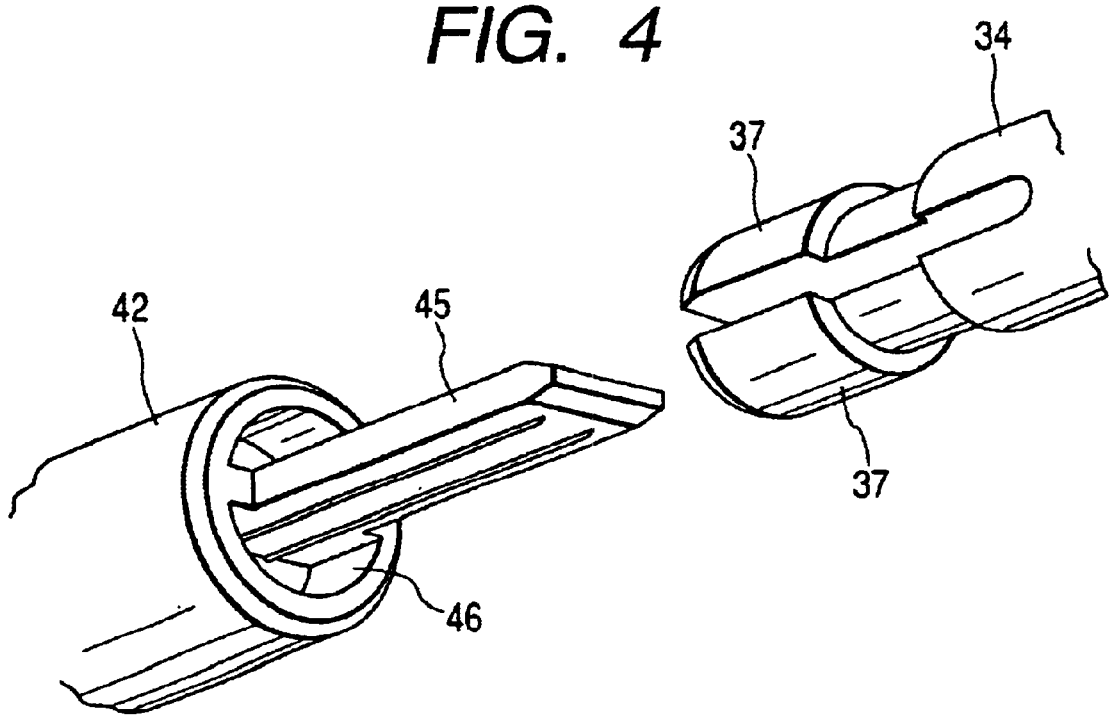
FIG. 4 is an exploded perspective view illustrating the primary part of the first embodiment.

A first shaft portion 34 is passed through the shaft insertion hole 4a of the cylindrical portion 4. An insertion portion 35 having a non-circular section is formed at an end-portion-side part of the first shaft portion 34. This insertion portion 35 is inserted and fitted into the connecting portion 32 (see FIGS. 2 and 3). An engagement convex portion 36 serving as an engaging portion is provided on a side surface of the insertion portion 35 in such a way as to project therefrom. This engagement convex portion 36 put into a state, in which the engagement convex portion 36 is inserted into and engaged with the engaging hole 33 of the connecting portion 32, is inserted into the shaft insertion hole 4a. As shown in FIG. 4, a pair of engaging claws 37 is provided in a part of the first shaft portion 34, which is at the side of the large-diameter portion 12. Such a pair of engaging claws 37 is inserted through engaging holes 11 of the lever base 1, and engaged therewith in a state in which the engaging claws 37 is prevented from slipping off therefrom.

Two sets of moderating mechanisms 38 for moderating an operation of turning the operating knob 31 are provided between the operating knob 31 and the stator 25. This moderating mechanism 38 consists of a convexoconcave moderating face portion 39 at the side of the operating knob 31, a moderating piece 40 for performing relative movement of this moderating face portion 39, and a moderating spring 41 for pushing this moderating piece 40 to the moderating face portion 39.

A second shaft portion 42 is inserted through the shaft insertion hole 8 of the attaching portion 3. A switch operating portion 43 is provided at a base portion of this second shaft portion 42 in such a way as to protrude sideways. A slip-off preventing convex portion 44 is provided on a part of an outer peripheral portion of this second shaft portion 42, which part is at the side of the base portion. This slip-off preventing convex portion 44 engages with an engaging hole 3a formed in the attaching portion 3 in such a manner as to extend in a direction perpendicular to the shaft insertion hole 8. Thus, the second shaft portion 42 is prevented from slipping off from the lever base in the axial direction. As shown in FIG. 4, an inserting piece portion 45 having a rectangular section is provided at an end part of the second shaft portion 42. A fitting cylinder portion 46 constituting a fitting portion is provided at the end part of the second shaft portion 42 in such a way as to surround this inserting piece portion 45. The end part of this second shaft portion 42 is inserted into the space portion 7 in the large-diameter portion 2. Further, the inserting piece portion 45 is inserted into between a pair of engaging claws 37 in the first shaft portion 34 like a wedge. The fitting cylinder portion 46 is fitted onto the pair of engaging claws 37 from the outside.

With this configuration, the first shaft portion 34 and the second shaft portion 42 are connected to each other in such a manner as to rotate as one unit. Further, the first shaft portion 34 and the second shaft portion 42 constitute a shaft portion 47 provided at the central portion of the lever base 1 in such a way as to penetrate therethrough in the axial direction. Incidentally, when an operation of turning the operating knob 31 is performed, the first shaft portion 34 and the second shaft portion 42 connected to each other are turned in the same direction, that is, the shaft portion 47 is turned in the same direction. Moreover, the switch operating portion 43 is turned. An operation of switching a light switch (not shown) provided in the switch base at the side of the vehicle is performed by using this switch operating portion 43.

Thus, the lever switch apparatus of the aforementioned configuration is configured so that a lever consists of the lever base 1, the cover member 20, the intermediate knob 22, the stator 25, and the operating knob 31, and that the substrate 14 serving as an electrical component is disposed in this lever.

Next, a procedure for assembling the lever switch apparatus of the aforementioned configuration is described hereinbelow.

(1) The lead wires 18 are connected to the connecting terminals 17 of the substrate 14, respectively, by soldering. At that time, the substrate 14 and the lead wires 18 are free of constraints, so that an operation of soldering the lead wires can be easily performed.

(2) The substrate 14, to which the lead wires 18 are soldered, is attached to the substrate attaching portion 5 of the lever base 1. Further, the lead wires 18 are inserted into and disposed in the lead wire guide portion 6 of the large-diameter portion 2. During a state in which the lead wires 18 are hooked by the hooking portion 9, a part of each of the lead wires 18, which is placed at the side of the connector 19, is projected to the attaching portion 3. At that time, a radial outer part, and both axial end parts of the lead wire guide portion 6 are opened. Thus, the lead wires 18 can be easily inserted into and disposed in the lead wire guide portion 6.

(3) The cover member 20 is attached to the exterior of the lever base 1 from the end portion side of the cylindrical portion 4 in such a manner as to cover the whole of the large-diameter portion 2 and the substrate 14. At that time, each of the lead wires 18 is covered with the cover member 20.

(4) The moving contact 23 is attached to the intermediate knob 22. Moreover, the moderating spring 30 and the moderating piece 29 of the moderating mechanism 27 are incorporated thereinto. This intermediate knob 22 is incorporated into the cylindrical portion 4 from the end-portion side thereof. As this intermediate knob 22 is incorporated thereinto, the moving contact 23 comes into contact with the stationary contact provided on the top-surface side of the substrate 14 during a state in which the moving contact 23 is inserted into the cover member 20.

(5) The moderating spring 41 and the moderating piece 40 of the moderating mechanisms 38 are incorporated into the stator 25. This stator 25 is incorporated into the cylindrical portion 4 from the end portion side thereof. At that time, the engaging portion 26 of the stator 25 is engaged with the engaging hole 12 of the cylindrical portion 4. Thus, the stator 25 is attached to the cylindrical portion 4 in such a way as to be in a fixed state.

(6) The insertion portion 35 of the first shaft portion 34 is inserted and fitted into the connecting portion 32 of the operating knob 31. Moreover, the engagement convex portion 36 is inserted into and engaged with the engaging hole 33. The operating knob 31 and the first shaft portion 34 is brought into a temporarily assembled state.

(7) The first shaft portion 34 temporarily assembled with the operating knob 31 is inserted into the shaft insertion hole 4a of the cylindrical portion 4 from the-end-portion-side part thereof. A pair of engaging claws 37 provided at the end portion is inserted into and engaged with the engaging hole 11 formed in the large-diameter portion 2. Thus, the first shaft portion 34 temporarily assembled with the operating knob 31 is tentatively fixed to the lever base 1. Further, a part of each of the connecting portion 32 and the insertion portion 35 is inserted into the shaft insertion hole 4a. Thus, the engagement between the engagement convex portion 36 and the engaging hole 33 is prevented from being canceled.

(8) The end portion of the second shaft portion 42 is inserted into the shaft insertion hole 8 of the attaching portion 3, which is provided in the lever base 1, from the base-portion side. Moreover, the inserting piece portion 45 is inserted into between the pair of engaging claws 37 like a wedge. Furthermore, the fitting cylinder portion 46 is fitted onto the pair of engaging claws 37 from the outside thereof. Further, the slip-off preventing convex portion 44 is engaged with the engaging hole 3a at the side of the attaching portion 3.

At that time, the slip-off preventing convex portion 44 is engaged with the engaging hole 3a. Thus, the second shaft portion 42 is prevented from slipping off in the direction of an arrow A1. Further, the pair of engaging claws 37 is engaged with the engaging hole 11. Consequently, the first shaft portion 34 is prevented from slipping off in the direction of an arrow A2. Further, the inserting piece portion 45 is inserted into between the pair of engaging claws 37 like a wedge. Thus, the pair of engaging claws 37 is restrained from moving in a direction, in which the engaging claws 37 come close to each other (that is, a direction in which the engagement is canceled). Moreover, a turning force of the first shaft portion 34 is transmitted to the second shaft portion 42. Furthermore, the fitting cylinder portion 46 is fitted onto the pair of engaging claws 37 from the outside. Thus, the pair of engaging claws 37 is restrained from moving in a direction, in which the engaging claws 37 go away from each other. Moreover, the first shaft portion 34 and the second shaft portion 42 are brought into a state in which these shaft portions 34 and 42 are connected to each other. Thus, the assembly of the lever switch apparatus for operating the light switch is completed.

The aforementioned first embodiment can obtain the following effects.

In the case of assembly of the apparatus, first, the lead wires 18 are connected to the connecting terminals 17 of the substrate 14 of an electrical component. Subsequently, the substrate 14 is attached to the substrate attaching portion 5 of the lever base 1. Moreover, the midway portion of each of the lead wires 18 is inserted into and disposed in the lead wire guide portion 6. Thereafter, the cylindrical cover member 20 is attached to the exterior of the lever base 1 in such a way as to cover the whole of the large-diameter portion 2 and the substrate 14. Thus, there is no need for performing an operation of inserting the lead wires 18 into the fine lead wire insertion holes. This enables the enhancement of assemblability. Further, because the large-diameter portion 2, the substrate 14, and the lead wires 18 are covered with the cover member 20, there is no necessity for forming a cutout in the cover member 20. Furthermore, the appearance of the apparatus is not impaired.

Further, the operating knob 31 placed at the end portion of the lever is configured in such a way as to be attached to the first shaft portion 34 by engaging the engagement convex portion 35 with the engaging hole 33. Thus, an additional member, such as a pin, for attaching the operating knob 31 is unnecessary. Therefore, no additional member appears on the design face (that is, an exterior surface) of the apparatus. Consequently, the appearance thereof can be improved. Moreover, this can improve the user's feeling obtained when the user's finger abuts against the design face.

Furthermore, the shaft portion 47 provided in a state, in which the shaft portion 47 penetrates through the lever base 1, has an end portion, to which the operating knob 31 is attached, and also has a base portion at which the switch operating portion 43 is provided. Thus, in the case that the apparatus has only one shaft portion, this shaft portion cannot be attached to the lever base 1. Therefore, the shaft portion is divided in an axial direction into the first shaft part 34 provided at the end-portion-side part to which the operating knob 31 is attached, and the second shaft part 42, which is provided at the base-portion-side part having the switch operating portion 43. Further, the pair of engaging claws 37 is provided in the first shaft part 34 in such a manner as to be inserted through the engaging hole 11 provided in the lever base 1 and as to be engaged therein in a slip-off preventing state. On the other hand, the inserting piece portion 45 to be inserted like a wedge between the pair of engaging claws 37 is provided at an end portion of the second shaft part 42, and the fitting cylinder portion 46 to be fitted onto the pair of engaging claws 37 from the outside. Thus, the first shaft part 34 and the second shaft part 42 are connected to each other in a state, in which the first and second shaft parts 34 and 42 rotate as one unit, by attaching the first shaft part 34 to the lever base 1 in such a way as to prevent the first shaft part 34 from slipping off therefrom.

SECOND EMBODIMENT

Figure 5:
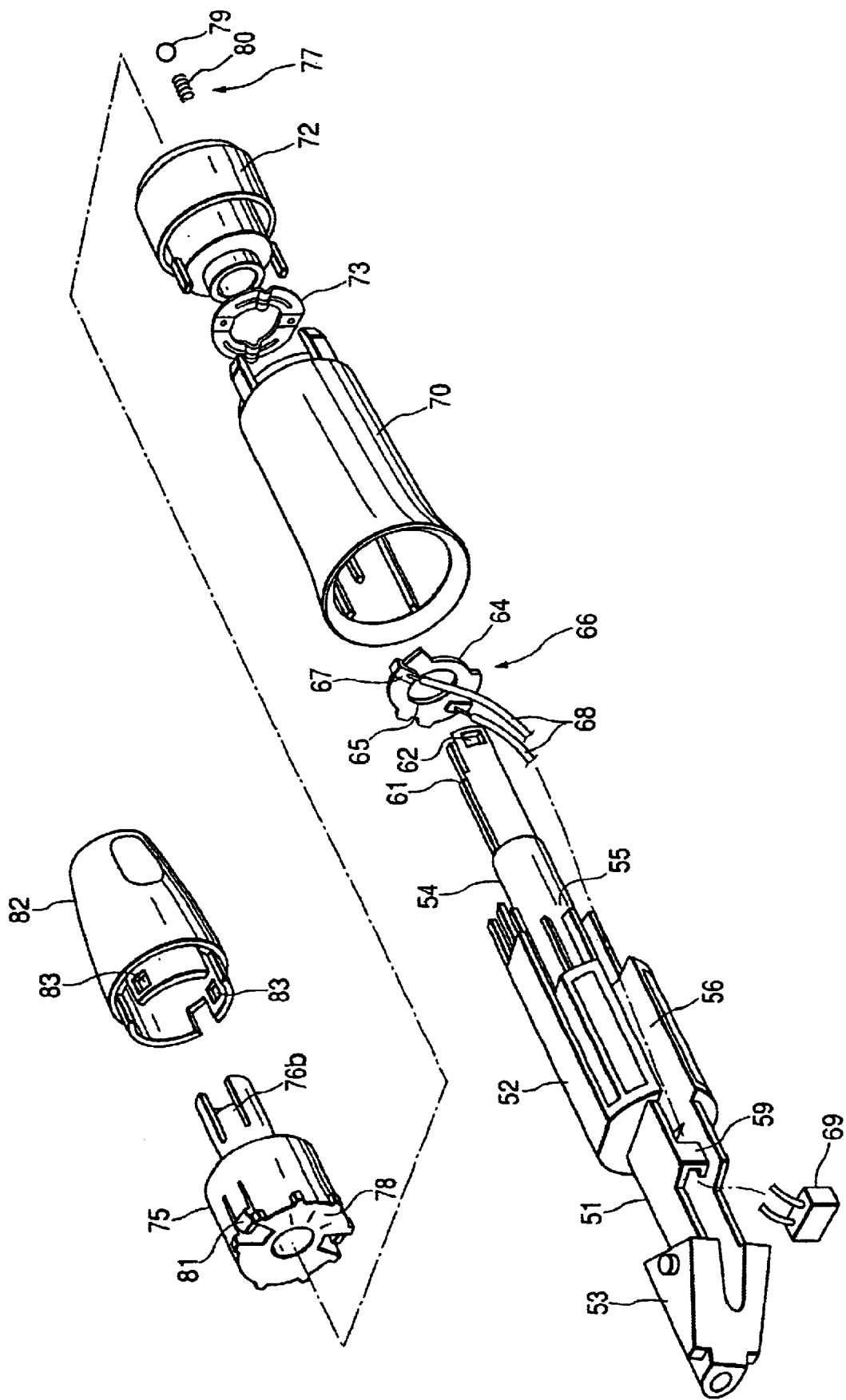
FIG. 5 is a view illustrating a second embodiment of the invention, which corresponds to FIG. 1.
Figure 6:
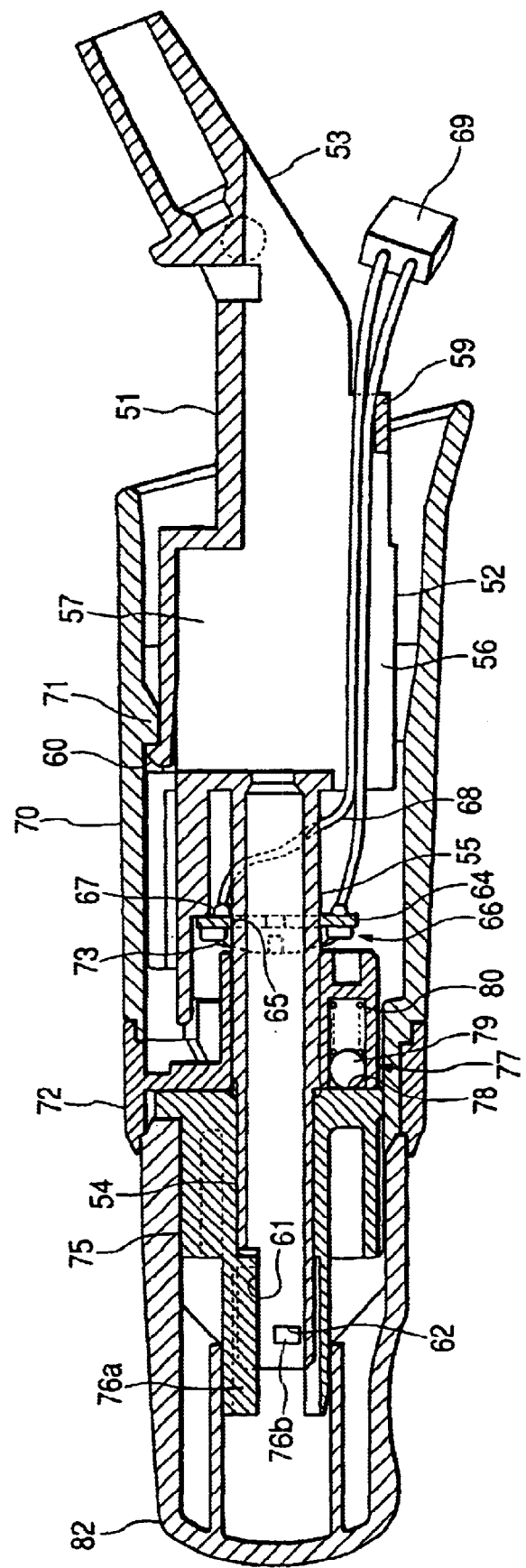
FIG. 6 is a view illustrating the second embodiment of the invention, which corresponds to FIG. 2.

Next, a second embodiment according to the invention is described by referring to FIGS. 5 and 6. In the case of this second embodiment, the invention is applied to a lever switch apparatus for a wiper of an automobile. Incidentally, this lever switch apparatus for a wiper is placed at a side opposite to the lever switch apparatus for the light switch.

The lever base 1 extends in an axial direction, and has a large-diameter portion 52, whose diameter is larger than those of other parts, provided in an intermediate portion in the axial direction. An attaching portion 53 to be attached to a vehicle (not shown) is provided at a base-portion side (that is, the left side in FIG. 1, and the right side in FIG. 2) of this large-diameter portion 52 in such a way as to be integral therewith. Moreover, a two-stage cylindrical portion 54, which is smaller in diameter than the large-diameter portion 52, is provided at an end-portion side in such a way as to be integral therewith. Furthermore, a board attaching portion 55 constituting an electrical component attaching portion is formed on the outer peripheral portion of the base portion of the cylindrical portion 54.

A lead wire guide portion 56 is formed at a place on the large-diameter portion 52. This lead wire guide portion 56 is opened at a radial outer portion and at both axial end portions. The central portion of the large-diameter portion 52 is formed to be a space portion 57. A lead wire hooking portion 59 for hooking a lead wire is provided at a part of the large-diameter portion 52, which is located at the side of the attaching portion 53. Elastic engaging claws 60 are provided on the outer peripheral portion of the large-diameter portion 52. A cutout portion 61 is formed at a place at an end-portion-side part of the peripheral wall portion of the cylindrical portion 54, and rectangular engaging holes 62 are formed at two places, only one of which is shown, thereof.

A resistor board 64 constituting an electrical component is shaped like a circular disk, which has an attaching hole 65 in the central portion. In this case, a resistor (not shown) of an interval adjuster 66 for an intermittent operation of the wiper is provided on a front-face-side portion thereof (that is, the right-side surface, as viewed in FIG. 5), while two connecting terminals 67 connected to the resistor are provided on a rear-face-side portion thereof. This resistor board 64 is disposed on the board attaching portion 55 by fitting an attaching hole 65 into the attaching portion 55 in such a manner as to be in a fixed state. An end portion of each of lead wires 68 is connected to each of the connecting terminals 67 by soldering. These lead wires 68 are inserted into and disposed in the lead wire guide portion 56 of the large-diameter portion 52, and caught by the hooking portion 59. During this state, the other end portion of each of the lead wires 68 is led to the side of the attaching portion 53 of the lever base 51. A connector 69 is provided at the other end portions of the lead wires 68.

A cylindrical cover member 70, whose diameter is larger than the diameter of the large-diameter portion 52, is attached to the exterior of the lever base 51. This cover member 70 is put over the lever base 51 from an end part of the cylindrical portion 54 of the lever base 1, and attached to the lever base 51 by engaging engagement convex portions 71 provided on the inside surface thereof with the elastic engaging claws 60. This cover member 70 covers the large-diameter portion 52 and the resistor board 64 from the outside.

An intermediate knob 72 for interval adjustment is turnably attached to the cylindrical portion 54 by being placed in such a way as to be closer to the end portion than the resistor board 64. A brush 73 is attached to a side of this intermediate knob 72, which side is at the side of the resistor board 64, in such a way as to turn integrally with the brush 73. The interval adjuster 66 consists of this brush 73 and the resistor of the resistor board 64. In this case, as an operation of turning the intermediate knob 72 is performed, the brush 73 slides to the resistor of the resistor board 64. Consequently, an operation of switching an interval time according to this sliding motion.

A stator 75 is attached to the cylindrical portion 54 by being positioned at a place that is closer to the end portion than the intermediate knob 22. This stator 75 is attached to the cylindrical portion 54 in a state, in which the stator 75 is prevented from turning, by engaging an engagement convex portion 76a, which is formed on the stator 75, with the cutout portion 61 of the cylindrical portion 54 and by engaging the engaging portion 76b with an engaging hole 62. A moderating mechanisms 77 for moderating an operation of turning the intermediate knob 72 is provided between this stator 75 and the intermediate knob 72. This moderating mechanism 77 consists of a convexoconcave moderating face portion 78 at the side of the stator 75, a moderating ball 79 for moving this moderating face portion 78, and a moderating spring 80 for pushing this moderating ball 79 to the moderating face portion 78. Elastic engaging claws 81 are provided on the outer peripheral portion of the stator 75 at opposed two places, only one of which is shown in FIG. 5.

A cap member 82 is disposed at a part, which is more closer to the end portion of the stator 75. This cap member 82 is shaped like a cylinder, which is closed at one end portion thereof. Two engaging holes 83 formed at two places in an end portion side part of the peripheral wall portion of the cap member 82. Consequently, the cap member 82 is attached to the stator 75 in such a way as to be in a fixed state.

Thus, the lever switch apparatus of the herein-above mentioned configuration is configured so that a lever consists of the lever base 51, the cover member 70, the intermediate knob 72, the stator 75, and the cap member 82, and that the resistor board 64 serving as an electrical component is disposed in this lever.

Next, a procedure for assembling the lever switch apparatus of the herein-above mentioned configuration is described hereinbelow.

(1) The lead wires 68 are connected to the connecting terminals 67 of the resistor board 64, respectively, by soldering. At that time, the substrate 64 and the lead wires 68 are free of constraints, so that an operation of soldering the lead wires can be easily performed.

(2) The resistor board 64, to which the lead wires 68 are soldered, is attached to the board attaching portion 55 of the lever base 51. Further, the lead wires 68 are inserted into and disposed in the lead wire guide portion 56 of the large-diameter portion 52. During a state in which the lead wires 68 are caught in the hooking portion 59, a part of each of the lead wires 68, which is placed at the side of the connector 69, is projected to the attaching portion 53. At that time, a radial outer part, and both axial end parts of the lead wire guide portion 56 are opened. Thus, the lead wires 68 can be easily inserted into and disposed in the lead wire guide portion 56.

(3) The cover member 20 is attached to the exterior of the lever base 51 from the end portion side of the cylindrical portion 54 in such a manner as to cover the whole of the large-diameter portion 52 and the resistor board 64. At that time, each of the lead wires 68 is covered with the cover member 70.

(4) The brush 73 is attached to the intermediate knob 72. Moreover, the moderating spring 80 and the moderating ball 79 of the moderating mechanism 77 is incorporated thereinto. This intermediate knob 72 is incorporated into the cylindrical portion 54 from the end-portion side thereof. As this intermediate knob 72 is incorporated thereinto, the brush 73 comes into contact with the resistor provided on the top-surface side of the resistor board 64 during a state in which the brush 73 is inserted into the cover member 70.

(5) The stator 75 is incorporated into the cylindrical portion 54 from the end portion side thereof. At that time, the engagement convex portion 76a of the stator 75 is engaged with the cutout portion 61 of the cylindrical portion 54. Moreover, an engaging portion 76b is engaged with the engaging hole 62. Thus, the stator 75 is attached to the cylindrical portion 54 in such a way as to be in a fixed state.

(6) The cap member 82 is put over the stator 75. Then, each of engaging holes 83 is engaged with a corresponding one of elastic engaging claws 81.

Even the aforementioned second embodiment can obtain the following effects.

In the case of assembly of the apparatus, first, the lead wires 68 are connected to the connecting terminals 67 of the resistor board 64 of an electrical component. Subsequently, the resistor board 64 is attached to the board attaching portion 55 of the lever base 51. Moreover, the midway portion of each of the lead wires 68 is inserted into and disposed in the lead wire guide portion 56. Thereafter, the cylindrical cover member 70 is attached to the exterior of the lever base 51 in such a way as to cover the whole of the large-diameter portion 52 and the resistor board 64. Thus, there is no need for performing an operation of inserting the lead wires 68 into the fine lead wire insertion holes. This enables the enhancement of assemblability. Further, because the large-diameter portion 52, the resistor board 64, and the lead wires 68 are covered with the cover member 70, there is no necessity for forming a cutout in the cover member 70. Thus, the appearance of the apparatus is not impaired.

The invention is not limited only to the aforementioned embodiments. The following modification and extension thereof may be made.

That is, a method of connecting each of the connecting terminals 17, 67 with a corresponding one of the lead wires 18, 68 is not limited to the soldering. The method of connecting each of the connecting terminals 17, 67 with a corresponding one of the lead wires 18, 68 may be a connector connection method.

Any electrical parts other than the substrate 14 and the resistor board 64 may be employed as the electrical component, as long as such electrical parts need lead wires.

As is apparent from the foregoing description, according to the invention, the lever apparatus for a vehicle, in which an electric component is provided in the lever, is constructed in the following manner. That is, first, the lead wire is connected to the connecting terminal of the electric component. Subsequently, the electric component is attached to the electric component attaching portion of the lever base. Moreover, the lead wire is inserted into and disposed in the lead wire guide portion of the large-diameter portion. Thereafter, the cylindrical cover member is attached to the outside face of the lever base in such a manner as to cover the whole of the large-diameter and the electric component. Thus, it is unnecessary to perform an operation of inserting the lead wire into the fine lead wire insertion hole. Thus, the assembly workability can be improved. Further, because the enlarged-diameter portion, the electrical component, and the lead wire are covered by the cover member, it is unnecessary to form a cutout in the cover member. Consequently, the appearance of the apparatus is not impaired.

What is claimed is:

1. A lever apparatus for a vehicle comprising:

a lever base including a large-diameter portion provided at an intermediate portion in a axial direction thereof, an electrical component attaching portion provided at a part thereof, which is closer to an end portion thereof than the large-diameter portion, and a base-portion attached to the vehicle;

a lead wire guide portion provided in the large-diameter portion and opened in a radial direction of the lever base and at axial end parts thereof;

an electrical component including a connecting terminal, which is attached to the electrical component attaching portion;

a lead wire including an end part thereof connected to the connecting terminal, a midway portion disposed in the lead wire guide portion, and the other end part to be led to the vehicle; and a cylindrical cover member for covering the whole of the large-diameter portion and the electrical component.

2. The lever apparatus according to claim 1 further comprising:

a shaft portion, provided in a central portion of the lever base so as to pass therethrough in the axial direction, and including an engaging portion provided at an end-portion-side part thereof and a switch operating portion provided at a base-portion-side part thereof; and an operating knob including a engaged portion, which is attached to an end part of the shaft portion by engaging the engaging portion with the engaging portion, and adapted to operate the switch operating portion through the shaft portion by a turning operation.

3. The lever apparatus according to claim 2, wherein the shaft portion is divided in an axial direction into a first shaft part, provided at the end-portion-side part to which the operating knob is attached, and a second shaft part, provided at the base-portion-side part including the switch operating portion, a pair of engaging claws is provided in the first shaft part so as to be inserted through an engaging hole provided in the lever base and as to be engaged therein in a slip-off preventing state, and an inserting piece portion to be inserted like a wedge between the pair of engaging claws, and a fitting portion to be fitted onto the pair of engaging claws from outside are provided at an end portion of the second shaft part.

* * * * *